United States Patent Office 3,726,842
Patented Apr. 10, 1973

3,726,842
MANUFACTURE OF MODIFIED ETHYLENE POLYMERS
Hans-Georg Trieschmann, 23 Birkenweg, 6736 Hambach, Germany; Johann Zizlsperger, 6 In der Hol, 6905 Schriesheim, Germany; Hans Gropper, 171 Sternstrasse, 6700 Ludwigshafen, Germany; Kurt Stark, 22 Viktoriastrasse, 6900 Heidelberg, Germany; and Karl Heinz Fauth, 1 Kopernikusstrasse, 6701 Frankenthal, Germany
No Drawing. Filed Apr. 8, 1971, Ser. No. 132,604
Claims priority, application Germany, Apr. 18, 1970, P 20 18 718.2
Int. Cl. C08f 15/04
U.S. Cl. 260—80.76    5 Claims

ABSTRACT OF THE DISCLOSURE

Production of modified ethylene polymers by polymerizing ethylene and/or ethylenically unsaturated monomers copolymerizable with ethylene at a pressure of more than 1,000 atmospheres and a temperature of from 150° to 400° C. in the presence of a free-radical polymerization initiator and an isobutylene oligomer containing from 4 to 100 isobutylene units. The resulting modified polymers of ethylene have a melt flow index of from 0.1 to 20 and are used for the production of transparent film and sheeting having low blocking values.

---

The present invention relates to a process for the manufacture of modified high-pressure polyethylene in which the polymerization of ethylene together, if desired, with other compounds copolymerizable with ethylene, is carried out in the presence of oligomers of isobutylene.

It is well known that polyethylene film and, more particularly, film of ethylene copolymers such as copolymers of ethylene with vinyl acetate or acrylic esters show a certain amount of surface tack known as "blocking." In order to prevent blocking, various additives have been incorporated in the polyethylene following its manufacture, for example diatomaceous earth, silicon dioxide and calcium carbonate. However, this method is commercially unsatisfactory, as it necessitates and additional step.

It is an object of the invention to provide a method of manufacturing modified ethylene polymers under high pressure, in which polymers are obtained from which non-blocking film may be produced.

We have found that this object is achieved by carrying out the polymerization in the presence of from 0.1 to 4% by weight, based on the ethylene used, of isobutylene oligomers containing from 4 to 100 isobutylene units, and also, if desired, in the presence of up to 40% by weight, based on the ethylene used, of other compounds copolymerizable with ethylene.

Isobutylene oligomers which are suitable for the process of the invention are obtained, for example, by the action of boron trifluoride on isobutylene at temperatures between 0° and −20° C. Processes for the oligomerization of isobutylene are described, for example, in Houben-Weyl, "Methoden der Organischen Chemie," published by Georg Thieme Verlag, Stuttgart, 1961, 4th edition, vol. 14/1, pp. 625–628. The isobutylene oligomers suitable for the present process contain from 4 to 100 and preferably from 5 to 20 isobutylene units per molecule. The isobutylene oligomers are used in an amount of from 0.1 to 4% and preferably from 0.5 to 2% by weight of the ethylene used.

In the process of the invention, the polymerization of ethylene may be carried out, if desired, in the presence of compounds which are copolymerizable with ethylene. Suitable comonomers are ethylenically unsaturated hydrocarbons of from 3 to 10 carbon atoms, for example propylene, butene-1 and 4-methylpentene-1. Particularly suitable comonomers are acrylates and methacrylates derived from alcohols of from 2 to 6 carbon atoms. Preferred other compounds copolymerizable with ethylene are n-butyl acrylate, t-butyl acrylate, methyl methacrylate and vinyl acetate. Vinyl ethers of from 3 to 10 carbon atoms are also suitable as comonomers. The comonomers are used in amounts ranging from 0 to 40% by weight on the ethylene used. When the polymerization is carried out in the presence of comonomers, it is preferred to use from 0.5 to 20% by weight of said comonomers based on the ethylene.

Suitable free-radical compounds are the well-known polymerization initiators such as peroxides, hydroperoxides, azo compounds and oxygen. For purposes of regulating the molecular weight of the modified polyethylene use may be made of all those compounds which are known to be useful for regulating the molecular weight of the polymer produced in the high-pressure polymerization of ethylene. Suitable regulators are, for example, hydrogen, ethylenically unsaturated hydrocarbons of from 3 to 10 carbon atoms which are at the same time comonomers, ketones, alcohols, ethers and saturated hydrocarbons. The regulators are used in quantities ranging from 0.1 to 5% by volume based on the monomers. The process of the invention may be carried out by usual methods in conventional apparatus. For example the polymerization of ethylene may be carried out batchwise in a stirred autoclave. The oligomer of isobutylene is placed in the autoclave together with a polymerization initiator and, if desired, with a regulator, and the autoclave is pressurized with ethylene and heated to the required temperature. However, the process may be operated continuously with particular success. We prefer to use tubular reactors such as are usual for the high-pressure polymerization of ethylene (cf. Ullmanns Enzyklopädie der Technischem Chemie, 3rd edition, published by Urban & Schwarzenberg, Munich-Berlin, 1963, vol. 14, pp. 139 et seq.).

The isobutylene oligomer is fed to the reactor together with the monomers in a pure form or as a solution in a hydrocarbon such as iso-octane or benzene by means of a suitable metering pump. The isobutylene oligomer may be added to the ethylene or the ethylene/comonomer mixture before or after pressurization thereof. In a particularly preferred embodiment of the process of the invention a tubular reactor is used and the isobutylene oligomer is pumped into at least one stream of ethylene passing to the reactor. The temperature of the stream of ethylene are chosen so that polymerization does not commence until after said addition. The pressures used range from 1,000 to 7,000 atmospheres and preferably from 1,700 to 3,500 atmospheres, the temperatures being from 150° to 400° C. As in the conventional high-pressure polymerization process the catalyst may be fed to the reactor at one or more points.

The process of the invention gives modified polyethylenes or ethylene copolymers which have melt indices of from 0.1 to 20 and densities ranging from 0.916 to 0.932 g./cm.$^3$. The isobutylene oligomer is chemically combined with the ethylene polymer. For example, it is not possible to extract the isobutylene oligomer from the modified polyethylene by means of usual extractants such as iso-octane. However, if a physical mixture of high-pressure polyethylene and an isobutylene oligomer is prepared, it is possible to remove the isobutylene oligomer by extraction with a solvent. Analysis by gel permeation chromatography gives two separate distribution curves in the case of the physical mixture of high-pressure polyethylene and the isobutylene oligomer, whilst only one curve is obtained in the case of the modified polyethylene manufactured by the process of the invention.

The modified polyethylene is particularly suitable for the manufacture of sheeting, as virtually no specks are formed. It is thus possible to produce sheeting of greater uniformity. Another advantage is that there is less risk of tearing occurring during sheeting manufacture and, consequently, modified ethylene polymers produced by the process of the invention may be fabricated on conventional apparatus of higher rates than is possible with, for example, conventional high-pressure polyethylene.

Sheeting may also be characterized by its blocking value, which may be determined by measuring the shear strength of strips of sheeting previously pressed together at 70° C. under a load of 80 g./cm.$^2$. Values obtained by this method for sheeting of high-pressure polyethylene are usually between 2 and 3, whilst they are between 0 and not more than 0.5 in the case of the modified polyethylenes. Sheeting made from the modified ethylene polymers shows better properties when subjected to shock, better cold resistance and better resistance to tear propagation than sheeting made from high-pressure polyethylene.

If the polymerization of ethylene is carried out in the presence of di-isobutylene, the advantages of the process of the invention are not obtained. The products are inhomogeneous and sheeting made therefrom is turbid and exhibits specks.

The process of the invention is described below with reference to examples. The polymerization apparatus used is a tubular reactor such as is conventionally used in continuous high-pressure polymerizations. The diameter of the reaction tube bears a ratio to its length of 1:14,000. The reaction tube is surrounded by a jacket tube for the accommodation of a heat-transfer agent. The jacket tube is divided into two zones which may be independently heated, the first zone extending over two fifths of the length of the tube (zone I), while the second zone extends over the remaining three fifths (zone II). At the end of the tube there is a valve serving to regulate the pressure in the polymerization chamber and also to allow discharge of the reaction mixture. Downstream of this valve there is a high-pressure separator and a low-pressure separator for the separation of the resulting polymer from unpolymerized material. In the following examples the parts are by weight.

EXAMPLE 1

Ethylene is fed to the said reactor at an hourly rate of 100 parts, the monomer being pressurized by a compressor from an initial pressure of 300 atmospheres to the polymerization pressure of 3,000 atmospheres. On the suction side of the compressor, 1 part of an isobutylene oligomer consisting of an oligomer mixture containing from 5 to 10 butylene units per molecule is added to the stream of ethylene. In addition, 20 p.p.m. of oxygen as catalyst and 10,000 p.p.m. of propylene as molecular weight regulator are fed to the polymerization reactor via the ethylene stream. The pressurized reaction mixture is then heated to 170° C. and reaches a peak of temperature of 300° C. during polymerization. The total residence time in the reaction tube is 3 minutes.

There are obtained 20 parts of a polymer having a density of 0.930 g./cm.$^3$ and a melt index of 6 (as measured according to ASTM D 1238—62 T). The unreacted ethylene, which is recycled to the process, contains only a small proportion of the isobutylene oligomer initially added. As may be seen from the following extraction values, the isobutylene oligomers are chemically combined with the polymer:

Extract in percent w./w.[1]
(1) Polymer of Example 1 containing 5% w./w. of polymerized units of isobutylene oligomer _____ 3.9
(2) High-pressure polyethylene (density 0.930 g./cc., melt index 6) _____ 4.0
(3) As (2) but containing 5% w./w. of isobutylene oligomer as used in (1) but in physical admixture _____ 9.0

[1] Extracted with toluene at 20° C.

The sheeting prepared from the polymer is homogeneous and contains no speck-forming portions.

EXAMPLE 2

There are fed to the polymerization reactor, per 100 parts of ethylene, 3 parts of a polyisobutylene mixture containing from 30 to 100 isobutylene units per molecule in the form of a 50% solution in benzene, the addition being effected by means of a high pressure pump such that the polyisobutylene solution passes into the ethylene stream after the latter has been pressurized to 200 atmospheres but before the reaction mixture is heated. 15 p.p.m. of oxygen and 10,000 p.p.m. of propylene are also added. The reaction mixture is heated to 200° C. and reaches a peak temperature of 310° C. during polymerization. In the low-pressure separator, 15 parts of a polymer having a density of 0.918 g./cc. and a melt index of 1.5 are separated. This polymer contains, in addition to the total amount of polyisobutylene initially added, 10,000 p.p.m. of benzene, which is removed from the melt by evaporation at a pressure of $10^{-2}$ mm. of Hg. The major amount of benzene used as solvent is dissolved in the residual ethylene and is removed therefrom by separators.

Sheeting made from the polymer is completely homogeneous and shows no tendency to blocking.

EXAMPLE 3

There are fed to the polymerization reactor, per 100 parts of ethylene, 2 parts of a pure isobutylene tetramer and 16 parts of vinyl acetate. Polymerization is carried out under the conditions described in Example 1 except that a peak temperature of 275° C. is maintained. There are obtained 23 parts of a copolymer having a melt index of 4 and a vinyl acetate content of 13.5% by weight. The blocking value of sheeting prepared from this material is 0.4.

EXAMPLE 4

There are fed to the polymerization reactor, per 100 parts of ethylene, 2.5 parts of a pure isobutylene tetramer and 4 parts of n-butyl acrylate in the manner described in Example 1. 25 p.p.m. of oxygen as catalyst and 12,000 p.p.m. of propane as regulator are also fed to the polymerization reactor via the ethylene stream. The pressure in the reactor is 2,800 atmospheres, the peak temperature being 280° C. There are thus obtained 26 parts of a copolymer having a melt index of 2.0 and an n-butyl acrylate content of 14.1% by weight. The blocking value of sheeting prepared from this material is zero.

COMPARATIVE EXAMPLE 1

Example 3 is repeated but without any addition of trimeric isobutylene. There are obtained 23 parts of a copolymer having a melt index of 3.8 and a vinyl acetate content of 13.6% by weight. The blocking value of sheeting prepared from this polymer is 4.

COMPARATIVE EXAMPLE 2

There are fed to the polymerization reactor, per 100 parts of ethylene, 1.2 parts of di-isobutylene such that the latter passes into the stream of ethylene after the ethylene has been pressurized to 2,000 atmospheres but before the reaction mixture is heated. 16 p.p.m. of oxygen and 6,000 p.p.m. of propylene are also added. The reaction mixture is heated to 200° C. and reaches a peak temperature of 312° C. during polymerization. In the low-pressure separator there are separated 14.5 parts of a polymer having a density of 0.917 and a melt index of 2.0.

Sheeting prepared from the polymer is turbid and contains a large number of cross-linked portions (specks). Assessed visually, it is regarded as highly specked. The blocking value is 0.9.

We claim:

1. A process for the production of modified polyethylene which consists essentially of polymerizing ethylene at a pressure of from 1,000 to 7,000 atmospheres and a temperature of from 150° C. to 400° C. in the presence of a free radical polymerization initiator and from 0.1 to 4% by weight, based on the ethylene used, of an isobutylene oligomer containing from 4 to 100 isobutylene units.

2. A process for the production of modified ethylene polymers which consists essentially of polymerizing ethylene with from 0.5 to 40% by weight, based on the ethylene used, of a monomer selected from the group consisting of olefins of from 3 to 10 carbon atoms, acrylic esters of alcohols of from 1 to 8 carbon atoms, methacrylic esters alcohols of from 1 to 8 carbon atoms, vinyl esters of saturated carboxylic acids of from 2 to 6 carbon atoms and vinyl ethers of from 3 to 10 carbon atoms, at a pressure of from 1,000 to 7,000 atmospheres and a temperature of from 150° to 400° C. in the presence of a free-radical polymerization initiator and from 0.1 to 4% by weight, based on the ethylene used, of an isobutylene oligomer containing from 4 to 100 isobutylene units.

3. A process as claimed in claim 1, wherein the polymerization is carried out in the presence of from 0.1 to 5% by volume of a polymerization regulator selected from the group consisting of hydrogen, olefins of from 3 to 10 carbon atoms, ketones, alcohols, ethers and saturated hydrocarbons.

4. A process as claimed in claim 2, wherein the polymerization is carried out in the presence of from 0.1 to 5% by volume of a polymerization regulator selected from the group consisting of hydrogen, olefins of from 3 to 10 carbon atoms, ketones, alcohols, ethers and saturated hydrocarbons.

5. Modified polyethylene produced by the process of claim 1, said polyethylene further having a melt index of from 0.1 to 20 and a density of from 0.916 to 0.932 g./cc.

References Cited
UNITED STATES PATENTS

| | | | |
|---|---|---|---|
| 3,050,497 | 8/1962 | Young | 260—45.5 |
| 3,089,832 | 5/1963 | Black | 204—158 |
| 3,598,885 | 8/1971 | Peters | 260—878 |

JAMES A. SEIDLECK, Primary Examiner

R. S. BENJAMIN, Assistant Examiner

U.S. Cl. X.R.

260—80.78, 80.81, 88.2 F, 878 R